May 17, 1966   D. A. WORDEN   3,251,376
PRESSURE REGULATOR AND PNEUMATIC NOISE FILTER
Filed March 6, 1964

INVENTOR.
Donald A. Worden
BY Emery, Whittemore,
Sandoe & Graham.
ATTORNEYS

United States Patent Office 3,251,376
Patented May 17, 1966

3,251,376
PRESSURE REGULATOR AND PNEUMATIC NOISE FILTER
Donald A. Worden, 99 West End Ave., Pompton Plains, N.J.
Filed Mar. 6, 1964, Ser. No. 349,847
6 Claims. (Cl. 137—484.8)

This invention relates to pressure regulators.

Regulators built to maintain the pressure within narrow limits depend on a very close balance of forces and must therefore have large pistons or diaphragms and a very low inherent friction. Such pistons, responding to a small pressure drop, seek new poistions of balance by further opening the throttling poppet. This increase flow through the throttle valve and the downstream pressure is rebuilt to the original level.

Unfortunately, because of inertia of the moving parts and of the flowing gas itself, the response tends to be out of phase with the signal. That is, by the time the poppet opens and enough gas passes through the throttle to rebuild the pressure, the signal, or the pressure level at the outlet, has already dropped. This results in a surge of pressure under the piston. The actuator reacts to this surge by reseating the metering valve, but the surge is temporary and the metering valve reopens. The cycle keeps on repeating itself. This instability is usually referred to as "chatter".

Various remedies for chatter have been proposed. Some of these use dash pots. Another way is to place a small orifice in the sensing connection between the outlet and the actuator chamber. This orifice permits no appreciable flow to or from the actuator chamber as a response to small oscillatory pressure fluctuation. The piston does not respond to these false signals and the chatter sequence does not start. However, this orifice also restricts the speed with which the real signal (such as an increase in flow demand) must be carried to the piston. The regulator has a sluggish response and may even start a new oscillatory cycle of a very low frequency but with a relativley high amplitude.

It is an object of this invention to prevent chatter of a pressure regulator without making the regulator have a sluggish response to real signals for flow demand changes.

The invention provides an obstruction in the sensing connection between the regulator outlet and the actuator chamber; but the obstruction is movable and, as it changes its position, offers progressively less obstruction to the flow of fluid to and from the actuator chamber.

Other objects, features and advantages of the invention will appear or be pointed out as the description proceeds.

In the drawing, forming a part hereof, in which like reference characters indicate corresponding parts in all the views.

Figure 1:
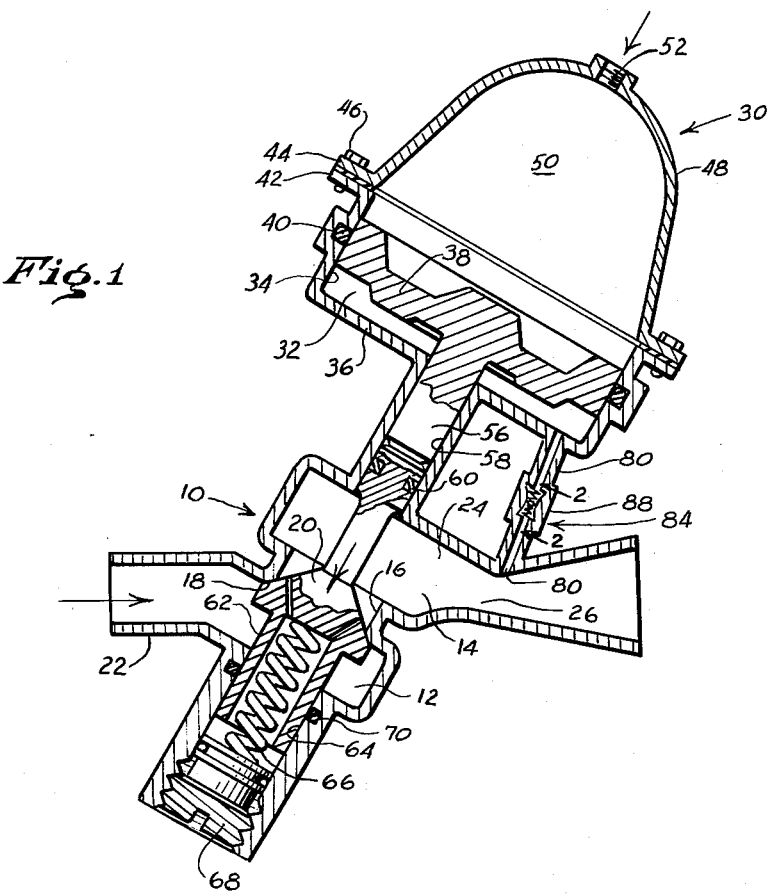
FIGURE 1 is a sectional view through a pressure regulator equipped with this invention.

The pressure regulator shown in FIGURE 1 includes a housing 10 enclosing a valve chamber which is divided into an upstream portion 12 and a downstream portion 14 communicating with one another through a passage 16 which is surrounded by a valve seat area 18. A valve element 20 is movable toward and from the seat area 18 to close and open the regulator to flow of fluid from the upstream portion 12 to the downstream portion 14 of the valve chamber.

Fluid enters the upstream portion 12 of the valve chamber through an inlet or supply passage 22 and fluid flows from the downstream portion 14 of the valve chamber through an outlet passage 24. The outlet passage 24 includes a length which is of venturi contour with a throat 26 where the cross section of the venturi contour is at a minimum.

The regulator has an actuator 30 including a chamber 32 with a cylinder circumferential wall 34 and an end wall 36. A piston 38 slides in the chamber 32 along the cylindrical circumferential wall 34. This piston 38 is a movable end wall for the chamber 32. A sealing ring 40, which is shown as located in a circumferential groove in the wall 34, prevents leakage of fluid past the piston 38. This sealing ring 40, which is preferably an O-ring, is merely representative of sealing means for preventing leakage past the piston 38. The wall 34 terminates, at its upper end, in a flange 42 which is bolted to a complementary flange 44 by bolts 46 located at angularly spaced regions around the circumference of the flanges 42 and 44. The flange 44 is at the lower side of a dome 48 which encloses a sensing pressure chamber 50 to which input reference pressure is supplied through an inlet passage 52 in a manner which is well understood by those skilled in the art. This sensing pressure chamber 50 is merely representative of means for loading the piston 38. Often a spring is used for loading the piston, or a diaphragm where such a movable wall is used instead of a piston. In any event, the means for loading the piston is adjustable to change the pressure for which the regulator is effective.

The piston 38 is connected with the valve element 20 by a stem 56 which constitutes a motion-transmitting connection between the valve element 20 and the movable wall of the chamber 32. The stem 56 slides in a cylindrical bearing 58 and has a seal 60, preferably an O-ring in a circumferential groove in the stem 56 for preventing leakage of fluid to and from the chamber 32 along the stem 56.

The valve element 20 has another stem 62 which extends downwardly across the upstream portion 12 of the valve chamber and this stem 62 slides in a cylindrical bearing 64 in the housing 10. The stem 62 is preferably hollow and contains a compression spring 66 which bears against an end fitting 68 of the pressure regulator to provide a pressure for urging the valve element 20 into contact with the seat area 16 so that the valve 20 has a bias toward closed position. An O-ring seal 70 surrounds the stem 22.

The valve element 20 is pressure balanced. The cross sections of the stems 56 and 62 are proportioned with the exposed areas of the valve element to obtain counterbalancing effects; and there are passages 74 through the valve element 20 putting the downstream portion 14 of the valve chamber in communication with the hollow interior of the stem 62 and the space which encloses the spring 66.

A passage 80 leads from the outlet passage 24 to the chamber 32. This passage 80 is the sensing connection between the downstream side of the valve chamber and the actuator pressure chamber 32.

Figure 2:
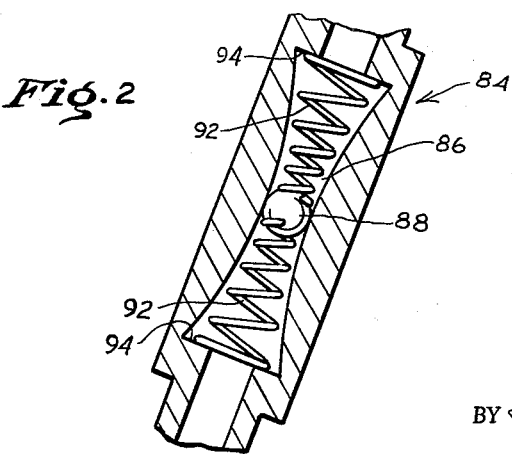
FIGURE 2 is a greatly enlarged sectional view through the sensing connection at and adjacent to the obstruction, the section being taken on the line 2—2 of FIGURE 1.

FIGURE 2 shows a fitting 84 which constitutes a part of the length of the passage 80. This fitting 84 has a mid-portion 86 which includes an obstruction consisting of a ball 88 which is of a diameter only slightly less than the inside diameter of the passage 80 at the mid-portion 86. Very little fluid can pass the ball 88 as long as the ball remains at the mid-portion 86 of the fitting 84 as shown in FIGURE 2. There are springs 91 and 92 on opposite sides of the ball 88 and compressed between the ball 88 and end walls 94 of the fitting 84. These springs 92 give the ball 88 a bias toward the mid position 86.

The diameter of the passage 80, for a substantial length on both sides of the mid-portion 86, increases up to the end walls 94. This increase may be a conical taper, but is preferably an exponential increase which gives the side walls of the passage a curved contour when viewed in section as in FIGURE 2.

The ball 88, fitting within the mid-portions 86 with a running fit, or slightly more clearance, is the equivalent of an orifice in the passage 80 for preventing chatter of the regulator. However, when there is a substantial change in pressure between opposite ends of the passage 80, the ball 88 is moved by the difference in pressure, against the light force of the spring 91 or 92, and this movement of the ball increases the clearance around the ball and provides for a rapid and substantial flow of fluid through the passage 88. It is the equivalent of enlarging the orifice or removing the orifice. It will be evident that movement of the ball 88 into a portion of the fitting 80 where the clearance around the ball 88 is equal in area to the cross section of the passage 80 beyond the fitting 84 is the equivalent of removing the obstruction entirely.

The preferred embodiment of the invention has been illustrated and described but it will be apparent that changes and modifications can be made and different constructions can be used for the movable obstruction within the scope of the appended claims.

I claim:
1. In a pressure regulator having a housing enclosing a valve chamber with a passage therethrough surounded by a seat area, a valve element movable toward and from the seat area to control flow of fluid through said passage, inlet and outlet passages communicating with the chamber on different sides of the seat area, a regulating pressure chamber having a movable wall and for sensing the downstream pressure, motion-transmitting connections between the movable wall and the valve element, and a communicating passage through which fluid on the downstream side of the valve element flows to and from the regulating pressure chamber, the improvement which comprises a flow obstruction in the communication passage including an element movable into different positions to reduce the amount of flow obstruction in the communication passage and to thereby shorten the time for sudden changes in downstream pressure to be sensed at said movable wall of the regulating pressure chamber, the obstruction having a bias toward a mid position and being movable in opposite directions from said mid position by pressure of fluid flow in the commuication passage between the pressure regulating chamber and the valve chamber on the downstream side of the valve element.

2. The pressure regulator described in claim 1 characterized by the obstruction being in position to provide its maximum obstruction when at the region of said mid position, and spring means that bias the obstruction toward said mid position.

3. The pressure regulator described in claim 1 characterized by the obstruction being an element that slides lengthwise in the communication passage, and the communication passage having a cross section that changes progressively to a larger size in both directions away from a throat, the obstruction element being small enough to slide through the throat and into the portions of the communication passage that are of larger cross section and yieldable springs urging the obstruction element into a mid position in said throat.

4. The pressure regulator described in claim 3 characterized by the obstruction element being a ball that substantially fills the cross section of the throat and the ball being free in the throat except for its contact with the springs.

5. The pressure regulator described in claim 1 characterized by the outlet passage from the valve chamber including a venturi ejector, and the communication passage connecting the regulating pressure chamber with the throat of the venturi ejector.

6. The pressure regulator described in claim 1 characterized by the valve element having stem portions that extend across the chamber and into sealed bearing means with the areas of the stems correlated with the seat area to pressure-balance the valve element, at least a part of the stem portions constituting the motion transmitting connections between the valve element and the movable wall of the regulating pressure chamber, said movable wall being a piston, and the regulating pressure chamber having a portion of its length of cylindrical shape with a seal ring around the circumference of the piston for preventing escape of fluid around the piston.

References Cited by the Examiner

UNITED STATES PATENTS

| | | | |
|---|---|---|---|
| 508,133 | 11/1893 | Gold | 137—505.35 |
| 2,173,416 | 9/1939 | Horstmann et al. | 137—484.8 |
| 2,459,326 | 1/1949 | Kremiller | 137—493 XR |
| 2,827,283 | 3/1958 | Browne et al. | 137—493 XR |
| 2,937,658 | 5/1960 | Stewart | 137—505 |
| 3,102,549 | 9/1963 | Worden et al. | 137—116.3 |

FOREIGN PATENTS 846,106  8/1960  Great Britain.

MARTIN P. SCHWADRON, *Acting Primary Examiner.*